(12) United States Patent
Seibert

(10) Patent No.: US 6,601,361 B2
(45) Date of Patent: Aug. 5, 2003

(54) ANCHOR PLATE FOR AN INSULATED CONCRETE WALL AND METHOD OF WALL ASSEMBLY

(75) Inventor: Dean M. Seibert, Wyomissing, PA (US)

(73) Assignee: Wind-Lock Corporation, Leesport, PA (US)

( * ) Notice: Subject to any disclaimer, the term of this patent is extended or adjusted under 35 U.S.C. 154(b) by 0 days.

(21) Appl. No.: 09/939,181

(22) Filed: Aug. 24, 2001

(65) Prior Publication Data

US 2003/0037506 A1 Feb. 27, 2003

(51) Int. Cl.[7] ............................................. E04C 5/00
(52) U.S. Cl. ..................... 52/698; 52/712; 411/466; 411/179; 411/461; 403/283
(58) Field of Search ................ 52/698, 712; 248/254, 248/256, 262, 201; 411/466, 179, 176, 461; 403/403, 283, 293, 402

(56) References Cited

U.S. PATENT DOCUMENTS

| | | | | |
|---|---|---|---|---|
| 2,339,841 A | * | 1/1944 | Deuchler et al. | 52/489.2 |
| 2,587,563 A | * | 2/1952 | Williams et al. | 248/265 |
| 2,733,036 A | | 1/1956 | Meletio | |
| 2,857,635 A | * | 10/1958 | Maple et al. | 403/280 |
| 3,247,779 A | * | 4/1966 | Willman | 248/265 |
| 3,281,168 A | | 10/1966 | Dufficy | |
| 3,417,652 A | * | 12/1968 | Menge | 411/466 |
| 3,472,118 A | * | 10/1969 | Jureit | 411/466 |
| 4,359,849 A | * | 11/1982 | Goeman | 52/479 |
| 4,486,115 A | * | 12/1984 | Rionda et al. | 411/466 |
| 4,490,953 A | | 1/1985 | Meola | 52/211 |
| 5,307,603 A | | 5/1994 | Chiodo | 52/698 |
| 5,546,723 A | * | 8/1996 | Jones | 411/461 |
| 5,588,629 A | | 12/1996 | Barnes | 248/475.1 |
| 6,131,867 A | * | 10/2000 | Mallek | 248/261 |
| 6,196,506 B1 | | 3/2001 | Wakai | 248/216.1 |

OTHER PUBLICATIONS

Owens Corning, "Foamular® Basement Wall Insulation System—Easy–to–do Home Basement Improvement Project & Installation Tips", 2 pages, date unknown.

* cited by examiner

Primary Examiner—Carl D. Friedman
Assistant Examiner—Nahid Amiri
(74) Attorney, Agent, or Firm—Howson and Howson

(57) ABSTRACT

An insulated concrete wall assembly having an embedded anchor plate which enables reliable mounting of fixtures, such as curtain rod brackets and the like, to an exposed surface of an interior wall of a building. The anchor plate is preferably an expanded metal plate having securement apertures of a size to receive and positively engage a fastener extending through wallboard and the anchor plate thereby permitting the fixture to be drawn into tight engagement with the wallboard by positive engagement of the fixture mounting fastener with the anchor plate. In addition, the anchor plate preferably has integrally formed securement projections, or spikes, which enable the anchor plate to be pressed into engagement with the rigid foam insulation before wallboard, such as drywall, is applied over the insulation. The invention also relates to a method of assembling an insulated concrete wall.

3 Claims, 5 Drawing Sheets

ANCHOR PLATE FOR AN INSULATED CONCRETE WALL AND METHOD OF WALL ASSEMBLY

BRIEF SUMMARY OF THE INVENTION

This invention relates to an insulated concrete wall and the ability to readily and reliably mount fixtures, such as curtain rod brackets and the like, to a surface of an interior wall of a building, and more particularly, the invention relates to an anchor plate and method of assembling a wall with an anchor plate which functions to positively engage fixture mounting fasteners driven through the wall thereby enabling fixtures to be drawn into tight engagement with the surface of the wall.

It is known to utilize concrete as a building material for above and/or below grade walls of building structures, such as residential buildings, thereby providing an alternative to traditional wood-framed structures. Several different building techniques can be utilized to construct a concrete house or building structure and may include the use of insulated concrete forms, concrete masonry units, autoclaved aerated concrete, or cast-in-place concrete walls made from removable forms. Regardless of the technique utilized to form the wall, at least one layer of a rigid foam insulation is present to insulate the concrete building structure.

For example, insulated concrete forms are rigid plastic foam forms that are filled with reinforced concrete to create structural walls. The forms are typically pre-formed interlocking blocks or separate panels connected with plastic ties. Concrete is poured into the forms and is permitted to cure. The forms remain in place on the cured concrete walls providing a continuous layer of insulation on both the interior and exterior surfaces of the concrete wall. The rigid foam insulation layer on the interior surface of the concrete wall provides a backing for wallboard, such as drywall, which forms the surface of an interior wall of the building. The rigid foam insulating forms are typically made of expanded polystyrene, extruded polystyrene, polyurethane, or a cement-foam composite.

Another example of an insulated concrete wall is provided by the use of pre-formed panels of rigid foam insulation which are applied to existing concrete or masonry walls. For example, a panel of a rigid foam insulation made of extruded polystyrene is sold under the trademark FOAMULAR INSULPINK as a basement wall insulation product. The rigid foam insulation panel is installed on the concrete or masonry basement wall surface facing the interior of the building and drywall is then applied directly over the rigid foam insulation panels.

Regardless of the building technique, one problem presented by an insulated concrete wall is that it is difficult to readily attach fixtures, such as curtain rod brackets and the like, on the wall in a manner which will resist disconnection from the wall. For example, the wallboard and rigid foam insulation to which a fixture mounting fastener, such as a screw or the like, is driven does not provide a surface which positively engages the fastener and prevents it from being pulled out of the wall.

Various anchor devices utilized for various purposes in building structures are known. For instance, U.S. Pat. No. 6,196,506 issued to Wakai discloses a metal anchor plate for mounting a screw to an existing plasterboard wall. The anchor plate according to the Wakai patent is driven through an existing plasterboard wall and is then pulled flush against the rear surface of the wall by an integral front element which is tethered to the anchor plate. Thus, a fastener, such as a screw, is then mounted to the wall and held in place by the perforated anchor plate.

Other examples of anchor plates or metal plates in general are provided by U.S. Pat. No. 5,588,629 issued to Barnes; U.S. Pat. No. 4,490,953 issued to Meola; U.S. Pat. No. 2,733,036 issued to Meletio; U.S. Pat. No. 5,307,603 issued to Chiodo; and U.S. Pat. No. 3,281,168 issued to Dufficy. The Barnes patent discloses a metal anchor plate having barbs which penetrate into a surface of a wall so that the anchor plate can be utilized as a hanger for supporting articles from the wall. The Meola patent discloses the use of an L-shaped metal corner bracket which is installed adjacent the corners of windows and doorways to prevent drywall cracking. The Meletio patent discloses an anchor plate for an electrical fixture mounted on an opposite side of an exterior brick wall. The Chiodo patent discloses an anchor device which has barbed projections which are imbedded in a top surface of a concrete wall and which has an exterior anchor plate for securing a structural member thereto. Finally, the Dufficy patent discloses a perforated truss connector plate.

While the aforementioned anchor devices, connector plates, insulated concrete wall assemblies, and methods of assembling insulated concrete walls may be satisfactory for their intended purposes, there is a need for a novel anchorage device, wall assembly, and method of wall assembly which enables secure attachment of fixtures and the like to an assembled insulated concrete wall. Preferably, the device is inexpensive to manufacture and its installation does not significantly add to the time or skill required to assemble a concrete wall.

Therefore, the principal object of this invention is to provide an insulated wall assembly to which a curtain rod bracket, or like fixture, can be readily mounted with a typical fixture mounting fastener. It is also an object to provide a method of assembling an insulated concrete wall which is reinforced at selected locations enabling curtain rod brackets and like fixtures to be reliably mounted to the wall.

The invention addresses the foregoing objects by providing an anchor plate for use within an insulated concrete wall of a building structure. The wall includes a layer of rigid foam insulation sandwiched between a concrete wall and wallboard which forms a surface of an interior wall of the building structure. The anchor plate is a substantially planar metal plate having a plurality of openings extending transversely therethrough and a plurality of securement projections extending transversely therefrom. The securement projections are formed as an integral part of the plate and are bent to extend transversely from the planar plate. In use, the securement projections secure the anchor plate to a selected area of the rigid foam insulation. The openings in the anchor plate are of a size to receive and positively engage a fastener which extends through the wallboard and the anchor plate thereby permitting a fixture to be drawn into tight engagement with the wallboard by the positive engagement of the fastener with the anchor plate. Preferably, the anchor plate is an expanded metal plate having an outer periphery with a plurality of corners which are bent to form securement projections.

According to another aspect of the invention, a method of assembling an insulated concrete wall having a layer of foam insulation on an interior-facing surface of a concrete wall is provided. The method includes attaching at least one anchor plate at a pre-selected location on the foam insulation, and thereafter, installing wallboard over the foam insulation such that the foam insulation is sandwiched between the concrete wall and the wallboard. The anchor plate has openings of a size to receive and positively engage a fixture mounting fastener which extends through the wallboard and the anchor plate thereby permitting a fixture to be drawn into tight engagement with the wallboard by the positive engagement of the fixture mounting fastener with the anchor plate embedded within the wall. Preferably, the anchor plate has securement projections and is attached to the rigid foam insulation by being pressed against the rigid foam insulation such that the securement projections penetrate within the insulation. In addition, preferably the anchor plate covers only a small fraction of the total surface area of the foam insulation and is located in the wall corresponding to the placement of a fixture to be installed on the wallboard. Preferably, the pre-selected location is adjacent a corner of a window and/or door constructed in the wall.

DETAILED DESCRIPTION

Figure 2:
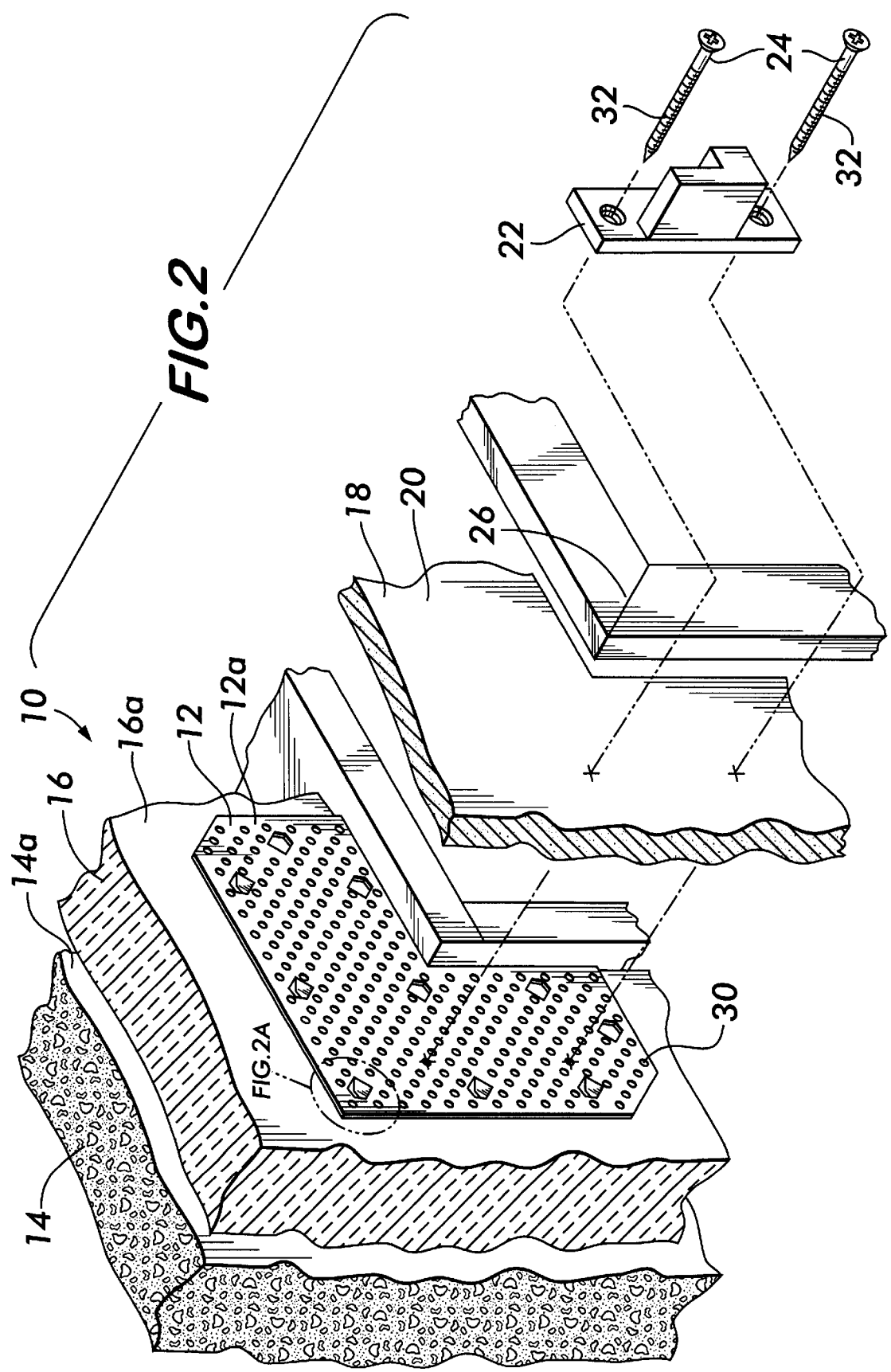
FIG. 2 is an exploded perspective view of a portion of the wall shown in FIG. 1.
Figure 4:
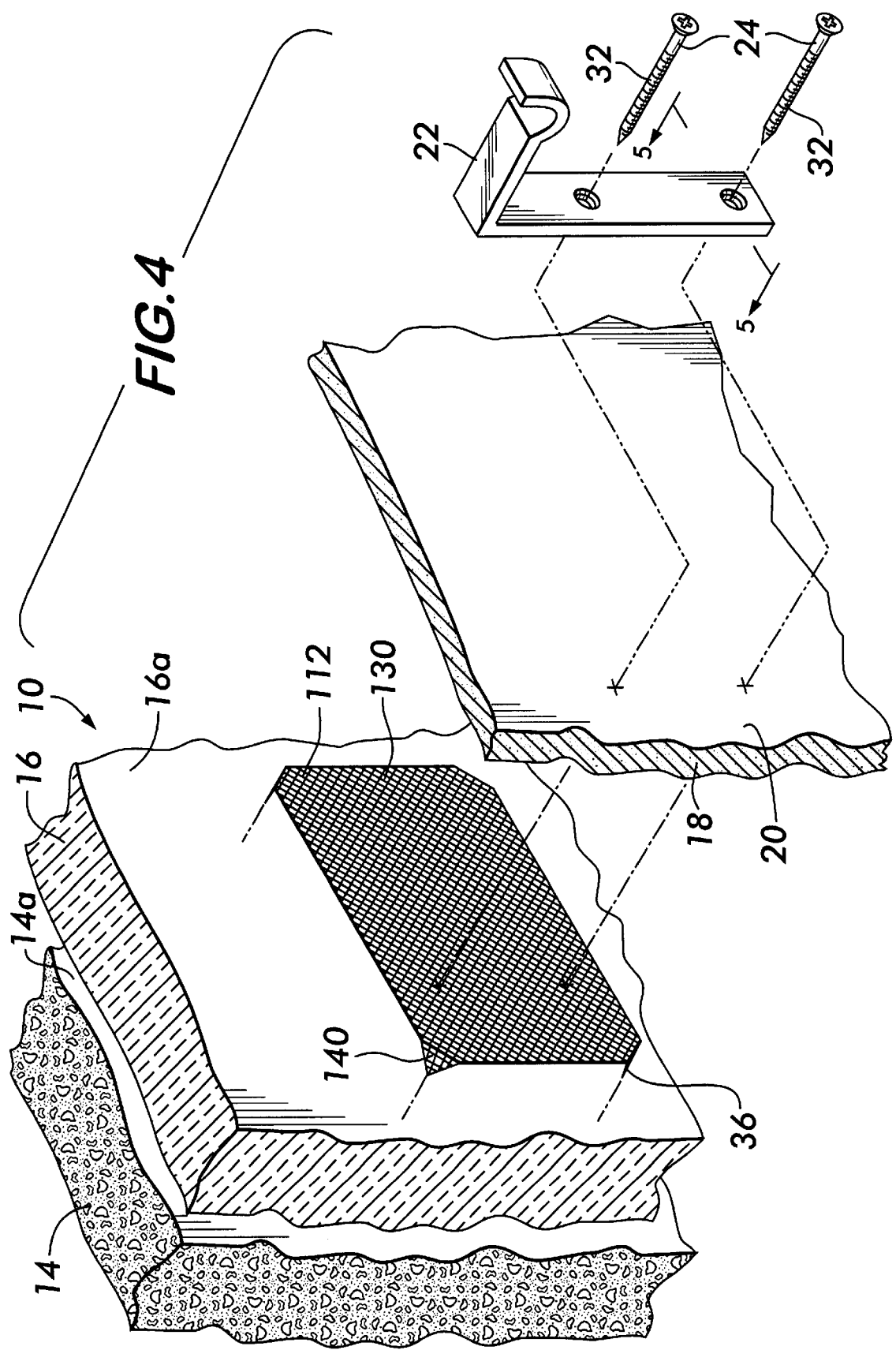
FIG. 4 is an exploded perspective view of a portion of a wall having a preferred anchor plate according to the invention.

As best illustrated in FIGS. 2 and 4, the invention relates to an insulated concrete wall assembly 10 which includes the use of an anchor plate 12, 112 embedded therein. In addition, the invention relates to a method of assembling an insulated concrete wall to which fixtures, such as curtain rod brackets and the like, can be secured in a reliable manner.

The wall assembly 10 includes a concrete wall 14 having a surface 14a facing the interior of the building and a layer of rigid foam insulation 16 overlying the interior-facing surface 14a of the concrete wall 14. As stated above, such a wall assembly 10 is typically constructed utilizing insulating foam concrete forms which remain in place after concrete has been poured and cures within the forms. Alternatively, the wall assembly 10 can be a cast-in-place concrete wall made with removable forms, or can be constructed of concrete masonry units or the like to which a separate panel of rigid foam insulation is applied. The rigid foam insulation is typically made of expanded polystyrene, extruded polystyrene, polyurethane, or a cement-foam composite.

A layer of wallboard 18, such as drywall panels, is typically installed over the insulation 16 and provides a vertically-disposed surface 20 of an interior wall within a building. Typically, fixtures 22 and the like are mounted on the surface 20 of the wall with fasteners 24 such as screws. In a wood-framed wall, the screws 24 are driven through the wallboard 18 and into the wood framing to reliably secure a fixture to the wall. Thus, since wood framing typically extends around a window or doorway, curtain rod brackets can readily be mounted adjacent the upper corners of the windows/doorways. However, in an insulated concrete form wall, no such wood framing elements are present, and fasteners 24, which are merely driven into the wallboard 18 and insulation 16, will readily pull out of the wall.

Figure 1:
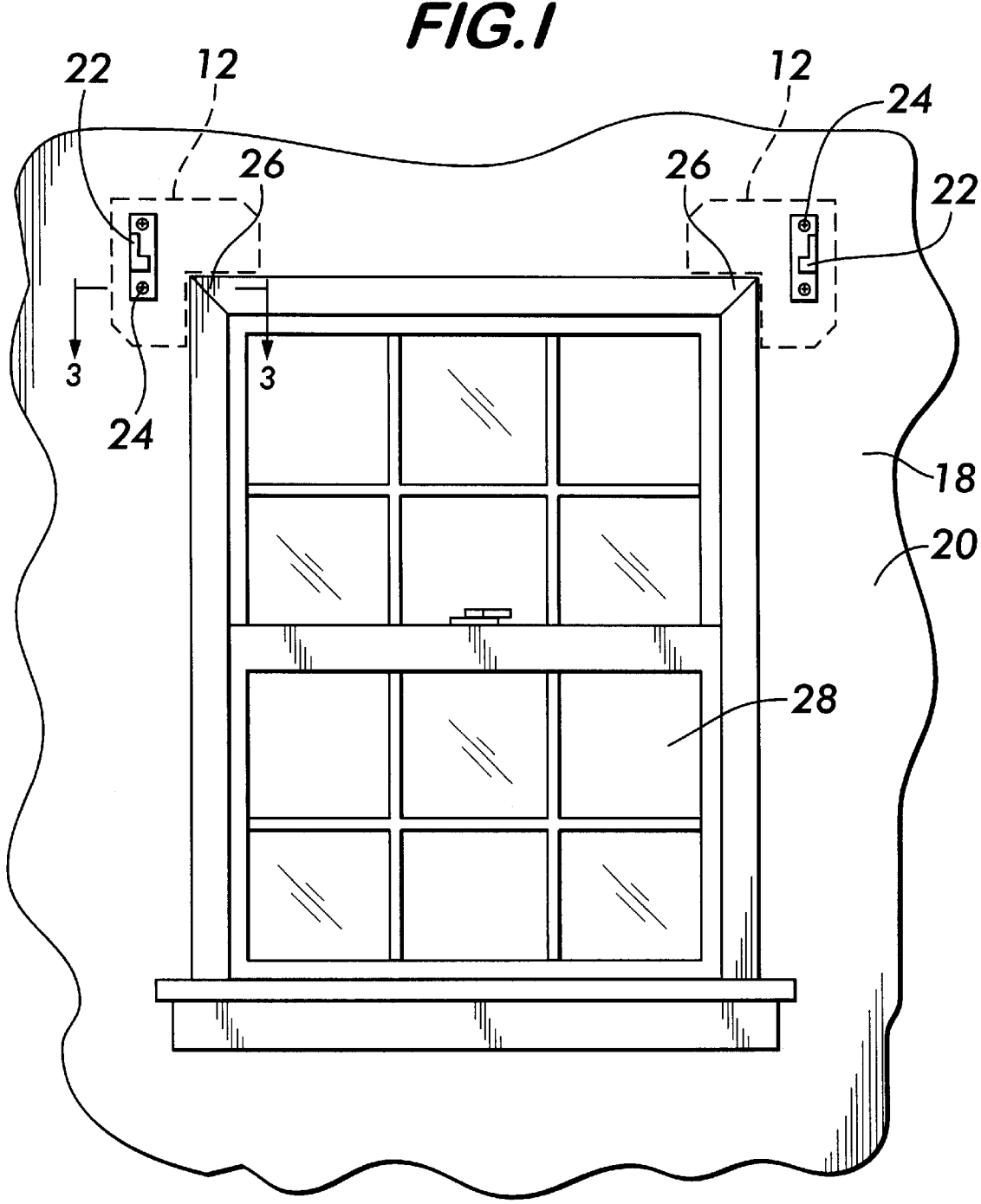
FIG. 1 is an elevational view of a portion of an interior wall of a building assembled according to the invention.

Thus, according to the invention, an anchor plate 12, 112 is installed within the wall assembly 10 for use in engaging a fastener 24 driven through the wallboard 18 and into the insulation 16. Preferably, the anchor plate 12, 112 has relatively small dimensions in comparison to the total surface area of the wall 10 and/or layer of insulation 16 so that the anchor plate 12, 112 can be readily handled and installed with one hand. For example, the anchor plate 12 is a substantially-planar, L-shaped, perforated metal plate which is installed on a section of the wall adjacent an upper corner 26 of a window 28 as illustrated in FIGS. 1 and 2. The anchor plate 12 is of a size which extends only in an area where a curtain rod bracket 22 would likely be installed. Thus, the majority of the surface area of the insulation 16 of the wall assembly 10 is not covered by the anchor plate 12. Another example of an anchor plate is illustrated in FIG. 4 in which the anchor plate 112 is a substantially-planar, rectangular, expanded metal plate.

The anchor plates 12 and 112 each have a plurality of openings, or securement apertures, 30, 130, which permit passage of fasteners 24 and which positively engage the shafts 32 of the fasteners 24 in a manner that prevents the fasteners 24 from becoming released from the anchor plates 12, 112. For instance, the openings 30, 130 may interact with the threads of a fastener 24 to permit the fastener to be screwed through the anchor plate 12, 112, or be intentionally unscrewed from the anchor plate 12, 112. This interaction permits the fixture 22 to be drawn into tight engagement with the surface 20 of the wallboard 18 and prevents unwanted release of the fixture 22 therefrom even when supporting the weight of a curtain and curtain rod.

Figure 5:
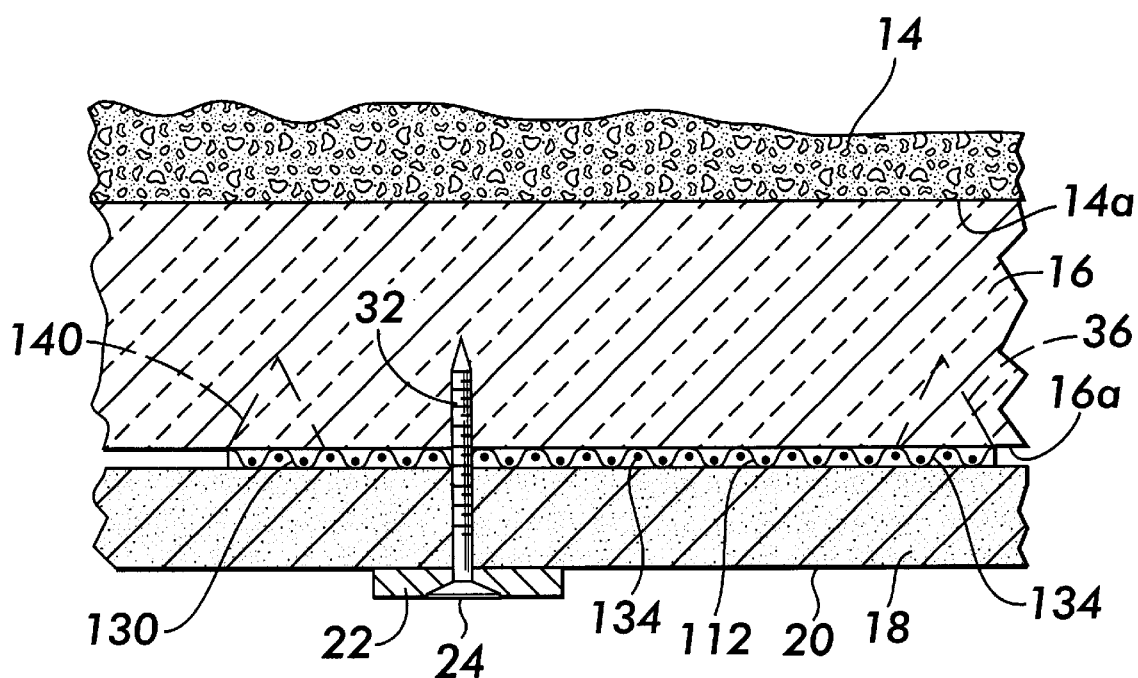
FIG. 5 is a cross-sectional view along the plane defined by line 5—5 in FIG. 4.

The most preferred embodiment of an anchor plate is the expanded metal plate 112. As best illustrated in FIG. 5, a plurality of interwoven metal strands 134 form a grid configuration thereby providing many openings 130 in the anchor plate 112 to ensure that a fastener 24 driven through the wallboard 18 will extend through one of the openings 130. In the event that the Fastener is not perfectly aligned with one of the openings 130, the strands 134 of the expanded metal plate are sufficiently resilient and flexible to enable the fastener to be received in an opening 130 and be positively engaged by the adjacent strands 134 of the plate.

Figure 3:
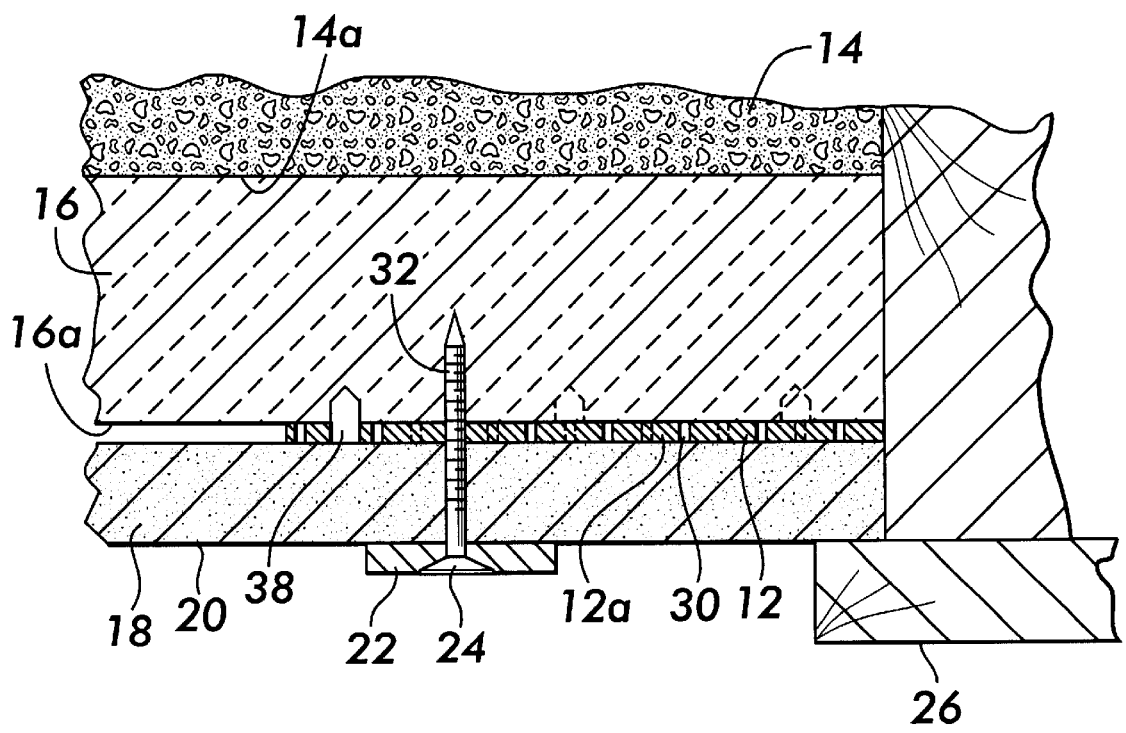
FIG. 3 is a cross-sectional view of the wall along the plane defined by line 3—3 in FIG. 1.

A contemplated alternate embodiment of an anchor plate is the perforated metal plate 12, preferably made of steel, illustrated in FIGS. 1–3. As clearly shown in FIG. 2, plate 12 has about two hundred-forty eight (248) openings 30 and ten (10) securement projections 36; thus, the openings 30 outnumber the projections 36 by greater than about 20:1. The openings 30 illustrated in FIG. 2 are of an identical size and shape and are closely spaced in a uniform pattern extending continually throughout the entire plate 12. Each adjacent pair of securement projections illustrated in FIG. 2 is separated by a plurality of openings 30. Yet other alternatives include plates made of plastic and other non-metals as well as plates without apertures through which a fastener can be driven and positively engaged.

Figure 2A:
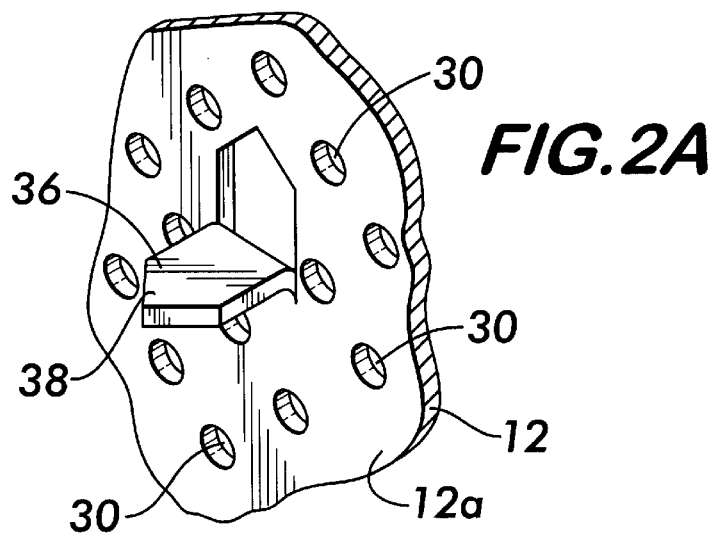
FIG. 2A is an enlarged perspective view of a securement barb of the anchor plate shown in FIG. 2.

Preferably, the anchor plates according to the invention include securement projections 36 which are used to mount the anchor plates at a desired location on the vertically-disposed surface 16a of the rigid insulation 16. To this end, anchor plate 12 has integral barbs 38 which are cut from the plate 12 and bent backward from the planar section 12a of the plate 12. See FIG. 2A. The securement projections 36 of anchor plate 112 are provided by the corners 140 of the plate 112 which are bent backwards and project substantially perpendicularly of the planar portion 112a of the anchor plate 112. In use, the securement projections 36 permit the anchor plates 12, 112 to be pressed into engagement with the surface 16a of the insulation 16 such that the securement projections 36 penetrate within the insulation 16 and retain the anchor plate 12, 112 in position on the insulation 16 during and after installation of the wallboard 18 over the insulation 16.

By way of example and not by way of limitation, the anchor plate 112 is provided as a four inch by eight inch rectangle of expanded metal having four corners 140 bent to form spikes 36 extending about 0.5 inches from the planar section 112a. The anchor plate is preferably installed adjacent a window at locations where a curtain rod bracket will be installed. Thus, the anchor plates cover only a very small percentage of the surface area of the insulation 16. For example, the anchor plates may cover less than 5% of the total surface area of the wall.

The method of assembling an insulated concrete wall of a building structure includes the step of installing wallboard 18, such as drywall, over a layer of rigid foam insulation 16 such that the foam insulation 16 is sandwiched between on outer concrete wall 14 and the wallboard 18. However, before the wallboard is installed, the method includes the step of installing at least one anchor plate 12, 112 on the surface 16a of the insulation 16. Thereafter, the wallboard 18 is installed over the insulation thereby embedding the anchor plate 12, 112 between the insulation 16 and wallboard 18.

As stated above, the anchor plate 12, 112 has openings 30, 130 of a size to receive and positively engage a fixture mounting fastener 24 which is driven through the wallboard 18 and anchor plate 12, 112 and into the insulation 16. The interaction between the anchor plate 12, 112 and the fastener 24 permits a fixture 22 to be drawn into tight engagement with the wallboard 18.

Preferably the anchor plate 12, 112 has integrally-formed securement projections 36, such as barbs 38 or bent corners 140, which enable the substantially planar anchor plate 12, 112 to be pressed against the rigid foam insulation 16 and maintained in position on the insulation due to the penetration of the securement projections in the insulation 16. This is best illustrated in FIGS. 3 and 5.

Preferably, the anchor plates 12, 112 are of size which can be readily held and installed with one hand, for instance, as a four inch by eight inch rectangular plate as described above. To this end, the method includes the step of selecting locations on the foam insulation 16 where anchor plates are desired. Thus, anchor plates 12, 112 will only be located at the pre-selected locations which, for instance, may correspond to less than 5% of the total surface area of the foam insulation 16. Thus, the anchor plates 12, 112 are relatively easy to install and do not add significantly to the material or labor costs in constructing an insulated concrete form wall 10 utilizing the embedded anchor plates 12, 112. As examples of pre-selected locations, anchor plates 12, 112 can be located on the insulation 16 adjacent the upper corners 26 of a window 28 and/or directly above the window 28.

Further, the method can include the step of mounting a fixture 22 to the exposed surface 20 of the wallboard 18. To this end, a fixture mounting fastener is driven through the wallboard 18 and anchor plate 12, 112 and into the insulation 16 such that the anchor plate 12, 112 positively engages the shaft 32 of the fastener 24 thereby permitting a fixture 22 to be drawn into tight engagement with the wallboard 18.

While a preferred embodiment of an anchor plate, insulated concrete wall installed with an anchor plate, and method of assembling an insulated concrete wall with an anchor plate have been described, various modifications, alterations, and changes may be made without departing from the spirit and scope of the invention as defined in the appended claims.

What is claimed is:

1. An anchor plate for use in an insulated concrete wall of a building structure, the wall including a layer of foam insulation sandwiched between a concrete wall and wallboard, the anchor plate comprising:

a substantially planar plate having a plurality of fixture mounting fastener openings extending transversely therethrough and a plurality of securement projections extending transversely therefrom, said plurality of fixture mounting fastener openings being greater in number than said plurality of securement projections;

said securement projections being formed as an integral part of said planar plate and having been bent to extend transversely from said planar plate, and said securement projections adapted for use in securing said planar plate to the foam insulation of the insulated concrete wall before the wallboard is installed on the foam insulation;

said fixture mounting fastener openings each being of an identical size and shape and each being adapted to receive a fixture mounting fastener which extends through the wallboard and said planar plate and to interact with threads of said fixture mounting fastener to permit said plate to positively engage the fixture mounting fastener in a manner which permits a fixture to be drawn into tight engagement with the wallboard by the positive engagement of the fastener with said planar plate;

said fixture mounting fastener openings being closely spaced in a pattern extending continually throughout the entire plate; and each adjacent pair of said securement projections being separated by a plurality of said fixture mounting fastener openings.

2. An anchor plate according to claim 1, wherein said anchor plate is of a size tat covers less than 5% of a total surface area of the foam insulation of the insulated concrete wall.

3. An anchor plate according to claim 1, wherein said plurality of fixture mounting fastener openings outnumber said plurality of securement projections by greater than 20:1.

* * * * *